United States Patent [19]

Rodemeyer et al.

[11] 4,064,839

[45] Dec. 27, 1977

[54] AMINATED ANIMAL HABITAT

[75] Inventors: Donald James Rodemeyer, City Island, N.Y.; John Eugene Hruby, Fairfield, N.J.

[73] Assignee: Metaframe Corporation, Elmwood Park, N.J.

[21] Appl. No.: 655,658

[22] Filed: Feb. 5, 1976

[51] Int. Cl.² .............................................. A01K 1/03
[52] U.S. Cl. ....................................... 119/15; 119/18; 119/29
[58] Field of Search .................. 119/15, 29, 17, 18; 43/217, 61; 180/65; 185/17, 19; 280/206–208; 46/113, 217

[56] References Cited

U.S. PATENT DOCUMENTS

| | | | |
|---|---|---|---|
| 724,931 | 4/1903 | Phillips | 43/61 |
| 1,887,869 | 11/1932 | Clampitt | 119/17 |
| 2,068,210 | 1/1937 | Walker | 119/33 |
| 3,494,617 | 2/1970 | Glass et al. | 46/217 |
| 3,682,477 | 8/1972 | Harkins | 119/29 |
| 3,788,277 | 1/1974 | Willinger et al. | 119/29 |
| 3,791,346 | 2/1974 | Willinger et al. | 119/15 |

Primary Examiner—Jay N. Eskovitz
Assistant Examiner—Peter K. Skiff
Attorney, Agent, or Firm—Max E. Shirk; Stephen L. King; John M. May

[57] ABSTRACT

An animal habitat includes an exercise wheel simulating the drive wheel on a steam-powered locomotive; protuberances on the exercise wheel strike a trip wire which swings a locomotive bell and an idler disc connects the exercise wheel to simulate locomotive running wheels which may be suitably decorated to produce an effect pleasing to the eye when the running wheels are rotated by the exercise wheel which, in turn, may be rotated by an animal housed in the habitat.

1 Claim, 8 Drawing Figures

4,064,839

AMINATED ANIMAL HABITAT

BACKGROUND OF THE INVENTION

The background of the invention will be set forth in two parts.

1. Field of the Invention

This invention relates to animal habitats, and more particularly, to new and useful animation devices for an animal habitat provided with an exercise wheel.

2. Brief Description of the Prior Art

Pertinent prior art known to applicant comprises the following Patents:

| United States | Great Britain |
|---|---|
| Freer Re. No. 18,273 | Shill No. 321,355 |
| Friz Des. No. 52,474 | |
| Cliffgard et al Des. No. 194,783 | |
| Willinger et al Des. No. 231,371 | |
| Hendryx No. 277,724 | |
| Peirano No. 320,960 | |
| Stakutis No. 1,420,880 | |
| Clampitt No. 1,887,869 | |
| Walker No. 2,068,210 | |
| Siegel No. 2,640,460 | |
| Harkins No. 3,682,477 | |

Generally speaking, the art shows animal habitats having exercise wheels and the like. The present invention exemplifies improvements over this art and over the animal habitat claimed in a copending application filed by Dennis H. Merino on June 7, 1976 under Ser. No. 693,413.

SUMMARY OF THE INVENTION

The present invention is directed, in brief, to the provision of a new and useful animated animal habitat.

The best mode currently contemplated for carrying out the invention includes the provision of animating apparatus in an animal habitat of a type having an exercise wheel simulating the drive wheel on a steam-powered locomotive. The animating apparatus is actuated when an animal rotates the exercise wheel.

DESCRIPTION OF THE PREFERRED EMBODIMENT

Figure 1:
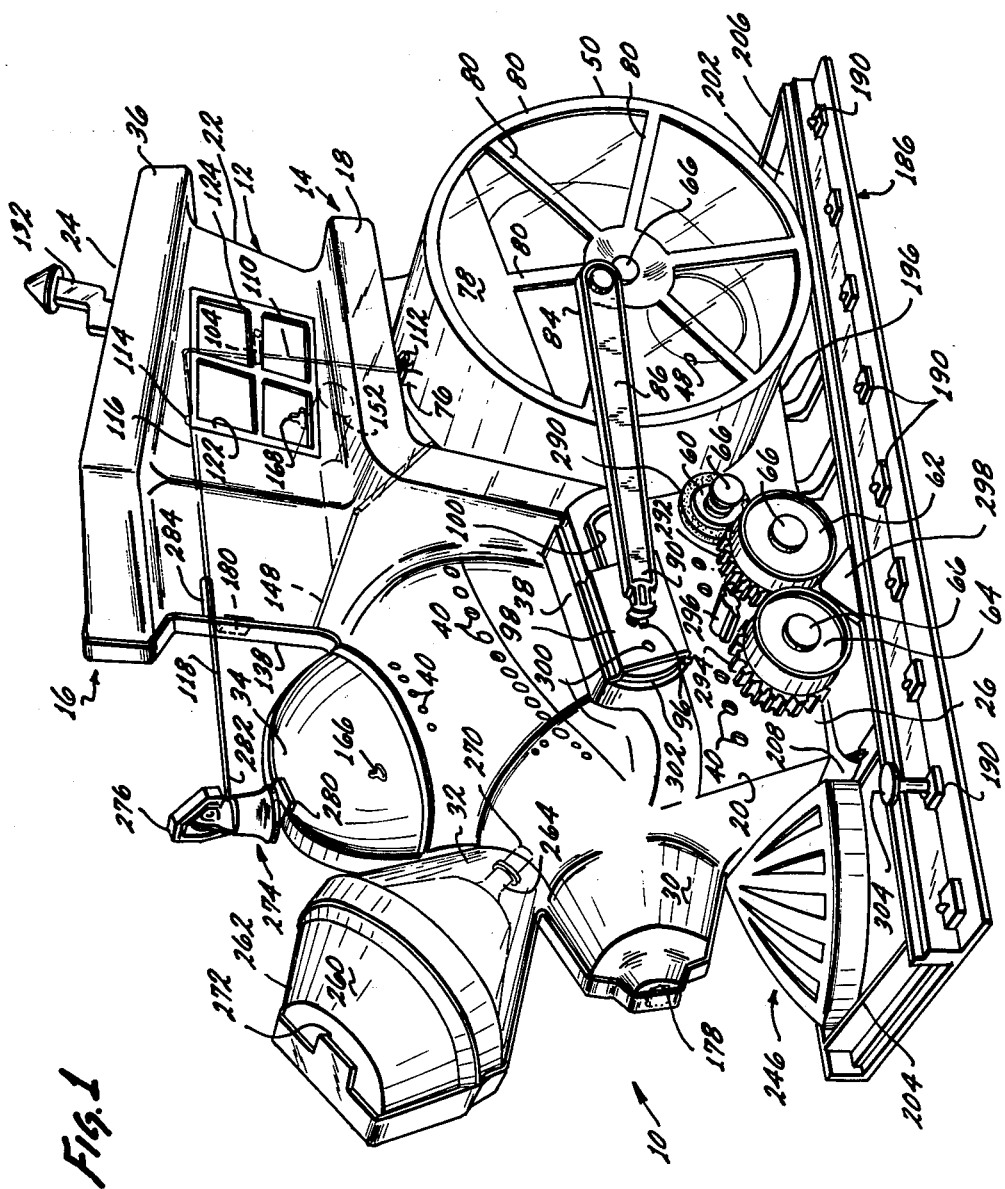
FIG. 1 is a perspective view of an animated animal habitat constituting a presently-preferred embodiment of the invention.
Figure 2:
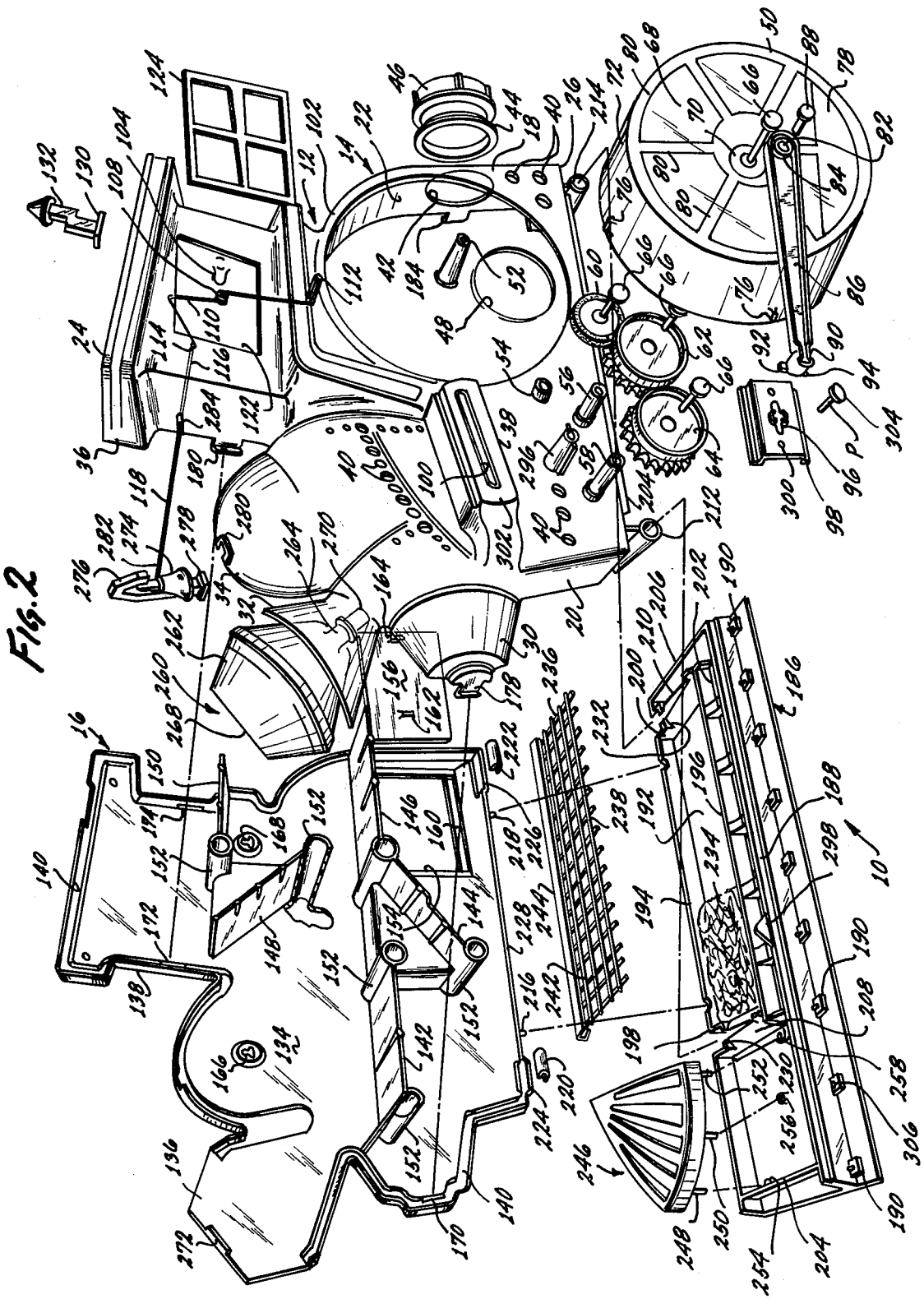
FIG. 2 is an exploded perspective view, on a reduced scale, of the habitat of FIG. 1.

Referring again to the drawings, and more particularly to FIGS. 1 and 2, an animated animal habitat constituting a presently-preferred embodiment of the invention, generally designated 10, includes a housing 12 defined by a front housing half 14 and a rear housing half 16.

The front housing half 14 may be molded as a one-piece member from a suitable transparent or translucent polymeric material and includes a front wall 18, a left end wall 20, a right end wall 22, a top wall 24, a bottom wall 26 and an open rear portion 28. The front housing half 14 is executed in what might be termed a "bas-relief" and is shaped to simulate an old-fashioned steam locomotive including a nose portion 30, a smoke stack 32, a steam dome 34, a cab 36 and a piston chamber or slider box 38. Front wall 18 may be provided with a plurality of aperatures 40 for ventilating habitat 10; right end wall 22 may be provided with an animal-access aperature 42 which may receive a coupling 44 to which an additional habitat (not shown) may be connected. Coupling 44 may be closed with a cap 46 when habitat 10 is used alone; a second animal-access aperature 48 may be provided in front wall 18 permitting an animal to move from housing 12 to an exercise wheel 50 simulating the drive wheel on a locomotive. A plurality of spindles 52, 54, 56 and 58 may be formed on front wall 18 during the molding operation and rotatably receive exercise wheel 50, an idler disc 60, a first simulated running wheel 62 and a second simulated running wheel 64, respectively. Disc 60 and each wheel may be retained in position on its spindle by a pin 66.

Exercise wheel 50 may be molded in one piece from a suitable transparent or translucent polymeric material and includes a recessed front wall 68, a hub 70, and an encompassing side wall 72, and an open rear portion 74 and a plurality of protuberances 76. These protuberances are uniformally spaced about side wall 72 for cyclically actuating an animating device, to be hereinafter described. The recessed front wall 68 may include a half-moon portion 78 which may be decorated with a suitable logo or the like (not shown). Wheel 50 may also be decorated with plurality of decals 80 simulating the spokes and rim of a wheel. Wheel 50 also includes an offset crank 82 to which the first end 84 of a simulated piston rod 86 may be affixed by a pin 88. Piston rod 86 includes a second end 90 which carries a pair of tabs 92, 94 engageable in a first slot 96, which is provided on a slider 98, and a second slot 100, which is provided in slider box 38, when piston rod 86 is rotated 90° from the position shown in FIG. 1, so that pads 92, 94 will lock piston rod 86 and slider 98 to slider box 38 when piston rod 86 is rotated back to its FIG. 1 position.

Figure 3:
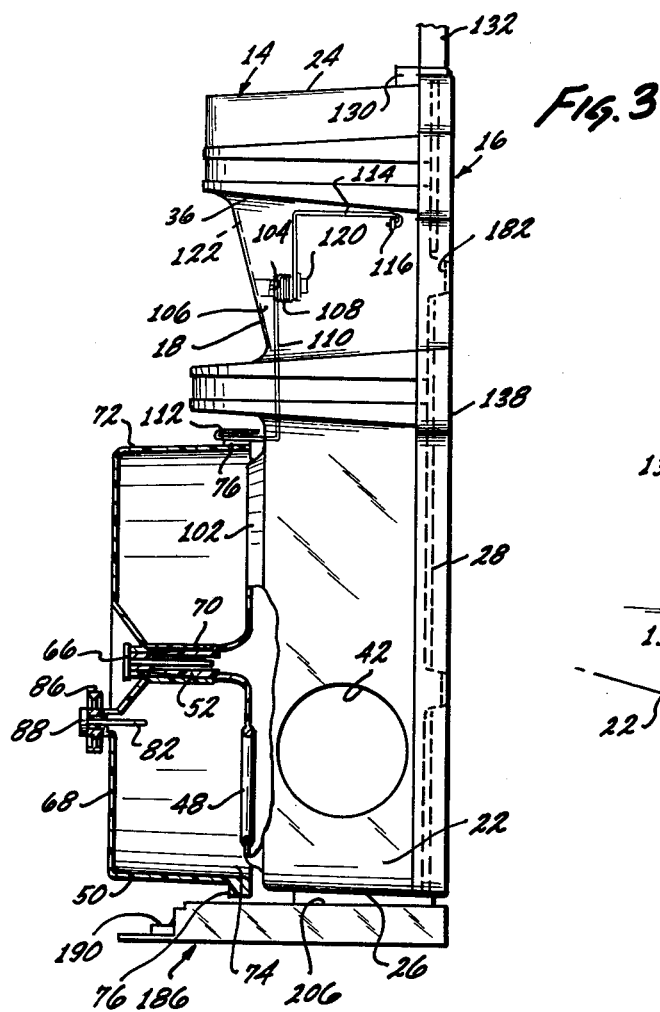
FIG. 3 is an enlarged, partial rear elevational view, with parts broken away to show internal construction, of an animal exercise wheel, and its associated parts, forming part of the habitat of FIG. 1.

As best seen in FIG. 3, the open rear potion 74 of wheel 50 encompasses an annular shoulder 102 provided on front wall 18 for minimizing the clearance between wheel 50 and wall 18. Additionally, a spindle 104 may be provided on the rear surface 106 of wall 18 for receiving the central, coiled portion 108 of a trip wire 110 having a first end 112 lying in the path-of-travel of protuberances 76 and a second end 114 connected to the first end 116 of a bell-ringing wire 118 (FIGS. 1 and 2). The coiled portion 108 of trip wire 110 may be maintained in position on spindle 104 by a snap cap 120.

Figure 4:
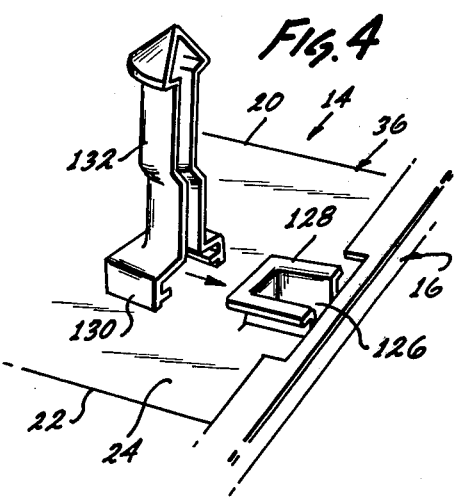
FIG. 4 is an exploded perspective view of a cover and access opening for a feeding chamber on the habitat of FIG. 1.
Figure 5:
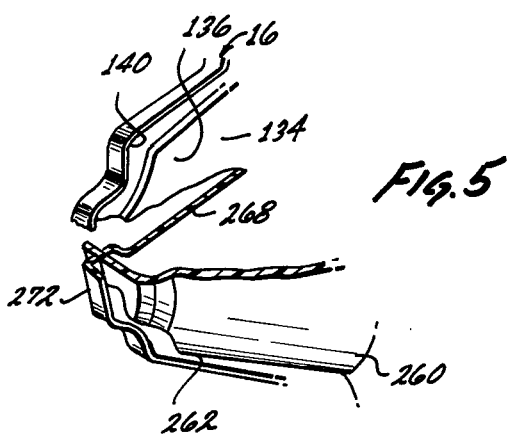
FIG. 5 is an enlarged, partial cross-sectional view of a water bottle which simulates a smoke stack on the habitat of FIG. 1.

Referring now to FIGS. 1, 2 and 3, front wall 18 may be provided with a recess 122 in the vicinity of tab 36 for receiving a decal 124 simulating a window. Additionally, top wall 24 of tab 36 may be provided with a small opening 126 (FIG. 4) through which small food pellets may be dropped without exposing the hand of the person dropping the pellets to an animal in habitat 10. Opening 126 is surmounted by a U-shaped flange 128 adapted to receive the flanged, lower end 130 of a simulated chimney 132, which may be used to close opening 126 between feedings.

Referring now to FIGS. 1, 2, 3 and 8, the rear housing half 16 may be molded in one piece from a suitable polymeric material and includes a plannar member 134 having an inner surface 136 and an outer surface 138. A peripheral channel 140 is provided on inner surface 136 for trapping the open rear portion 28 of the front housing half 14 in a manner such that channel 140 channels waste or water fluids to the bottom of housing 12. A plurality of ramps 142, 144, 146, 148 and 150 are formed on inner surface 136 during the molding operation, together with supporting cyclindrical members 152. These ramps and cyclinders are designed and arranged to provide a maximum climbing area for an animal in habitat 10 without substantially restricting the flow of air through habitat 10. Plannar member 134 is provided with an animal-access opening 154 which may be closed by a door 156 slidably mounted in a pair of ways 158, 160 provided on the outer surface 138 adjacent the upper and lower edges of opening 154, respectively. Door 156 is provided with a pair of lugs 162, 164 engagable with the front and rear edges, respectively, of opening 154 to prevent an animal from sliding door 156 to an open position. Door 156, on the other hand, may be readily opened and closed by flexing it sufficiently to permit lugs 162, 164 to pass beyond their associated edges. Plannar member 134 is also provided with a pair of keyhole-shaped aperatures 166, 168 which may be used to hang habitat 10 on a wall, if desired. Plannar member 134 is also provided with four slots 170, 172, 174 and 176 engagable by locking tabs 178, 180, 182 and 184, respectively, provided on the front housing half 14 for quickly and easily assembling and disassembling housing 12.

Habitat 10 also includes a base 186 which may be molded in one piece from a suitable polymeric material to simulate a railway bed having a track 188 and a plurality of ties 190. Base 186 includes a litter box 192 formed by a pair of upstanding side walls 194, 196 and a pair of end walls 198, 200 (FIG. 2). Side 196 is spaced from the simulated track 188 for forming a channel 202 for waste from exercise wheel 50. This channel may be closed by a front wall 204 and a rear wall 206. Base 186 may also be provided with a pair of split cyclindrical sleeves 208, 210 adapted to receive cyclindrical bosses 212, 214, respectively, which are provided on the bottom of front housing half 14 for connecting housing 12 to base 186 in an upstanding position with a small clearance between exercise wheel 50 and track 188. Housing 12 may be locked in this position by a pair of protuberances 216, 218 depending from housing half 16 for engagement inside side wall 194 on base 186 and by a pair of grommets 220, 222, which may be carried by a pair of tabs 224, 226, respectively, provided on the lower edge 228 of housing half 16. Grommets 220, 222 are engageble with protuberances 230, 232, respectively, carried by cyclindrical sleeves 208, 210, respectivly, for holding protuberances 216, 218 against side wall 194.

Litter box 192 may be filled with a suitable litter, as indicated at 234 in FIG. 2, and may be covered by a screen 236 having a front edge 238, which may be engaged on ledge 240 provided on the bottom of front housing half 14, and a rear edge 242, which may be fitted with a plastic sleeve 244 positionable on grommets 220, 222.

Habitat 10 also includes a simulated cow catcher 246 which may be connected to base 186 by a plurality of pins 248, 250, 252 engagable in hollow bosses 254, 256, 258, respectively, provided on base 186 between front wall 204 and cyclindrical sleeve 208.

Referring now to FIGS. 1, 2, 5 and 8, habitat 10 also includes a water bottle 260 shaped to complete the simulated smoke stack 32 and removably mounted therein. Bottle 260 includes a body portion 262 and a neck portion 264. The body portion 262 includes a rounded front portion 266 (FIG. 5) and a planar rear wall 268 so that bottle 260 will fit the space defined by simulated smoke stack 32 and planar member 134. Neck 264 may be covered with a metal sleeve 270 so that an animal drinking from bottle 260, which may be made from a plastic material, will not mutilate neck 264 by chewing it. The animal is prevented from dislodging water bottle 260 by a locking tab 272 extending inwardly over bottle 260 from rear housing half 16.

Figure 6:
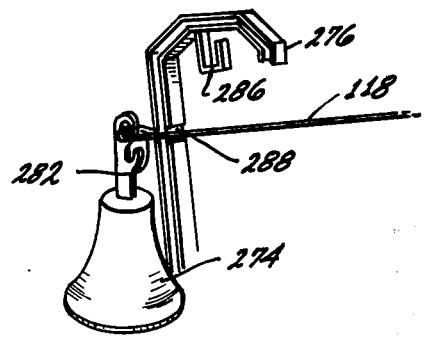
FIG. 6 is a perspective view of a bell forming part of an animating apparatus on the habitat of FIG. 1.

As best shown in FIGS. 1, 2 and 6, habitat 10 may be animated by a bell 274 swingably mounted on a simulated bell tower 276 having a flanged lower end 278 engagable with a U-shaped flange 280 provided on steam dome 34. Bell 274 is connected to the second end 282 of bell wire 118 for actuation when bell wire 118 is reciprocated by trip wire 110. Bell wire 118 may be slidably mounted in a slot 284 provided in the front wall 18 of housing half 14. Bell 274 may be prevented from ringing even though animal is rotating exercise wheel 50 by removing bell 274 from its hook 286 and engaging wire 118 in a narrow slot 288 on bell tower 276. Wire 118 is adapted to engage slot 288 with a friction fit so that bell 274 may be drawn snugly against bell tower 276.

Figure 7:
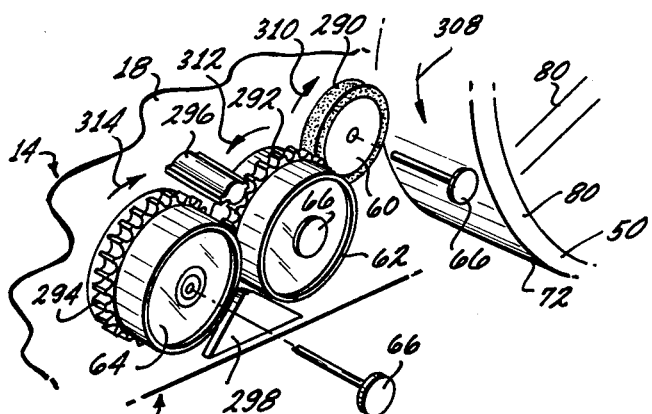
FIG. 7 is an exploded perspective view of simulated locomotive running wheels forming another part of an animating apparatus on the habitat of FIG. 1.
Figure 8:
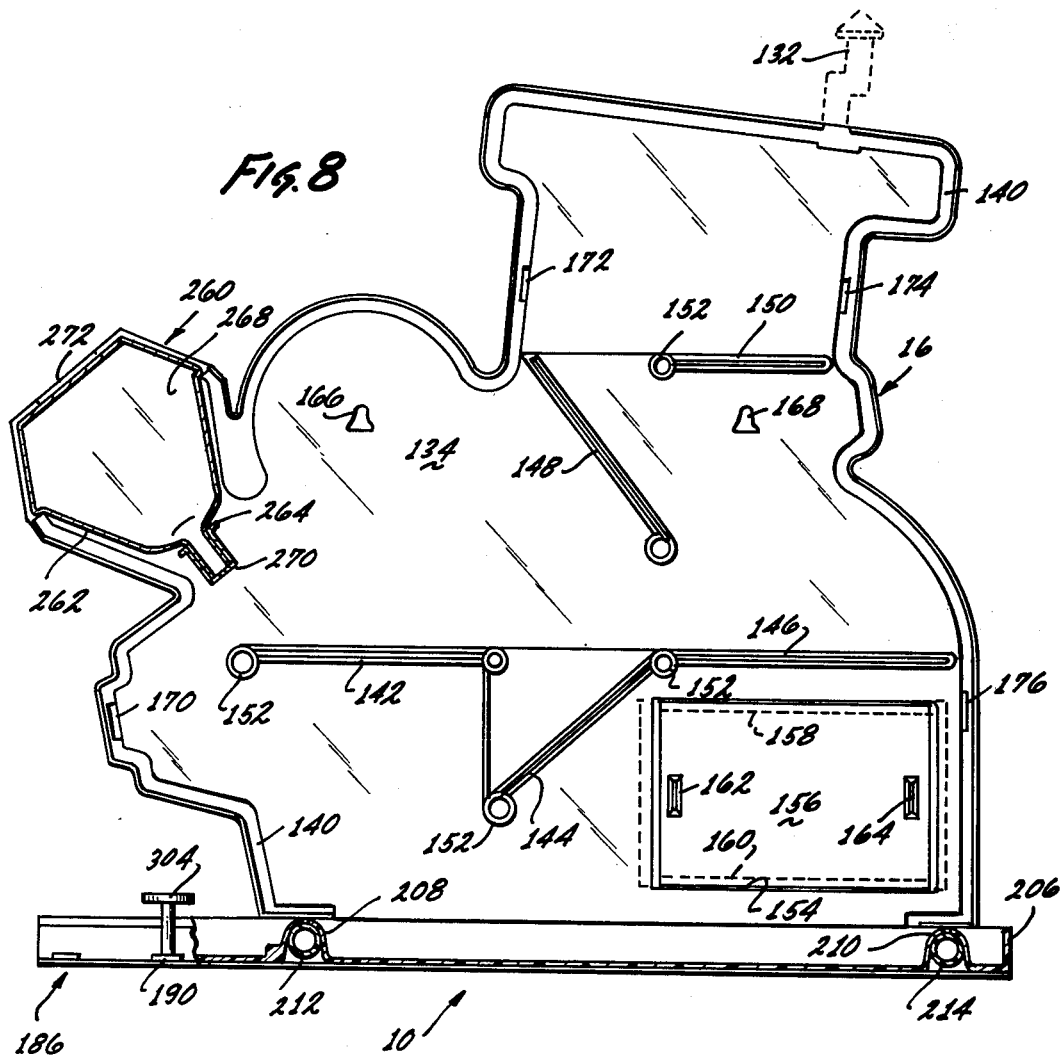
FIG. 8 is a front elevational view of the rear housing portion of the habitat of FIG. 1.

Referring now to FIGS. 1, 2 and 7, disc 60 is provided with an elastomeric tire 290 which engages exercise wheel 50 and running wheel 62 forming a driving connection there between. Running wheel 62 is provided with a gear 292 drivingly engaging a gear 294 on running wheel 64 for imparting rotation thereto. Small fingers may be kept from these gears by a pair of guards 296, 298 provided on front housing half 14 and base 186, respectively.

Unwanted rotation of exercise wheel 50 may be prevented by rotating wheel 50 till a small aperature 300 in slider 98 is immediately forward of the front edge 302 of slider box 38 and by inserting a pin 304 into aperature 300 to block piston rod 86. When not in use, pin 304 may be stored in an aperature 306 (FIG. 2) provided in one of the simulated ties 190 on base 186.

Use of habitat 10 is believed to be apparent and it is briefly summarized at this point.

A suitable animal, such as a hamster, may be placed in habitat 10 by opening door 156. The animal is then free to explore the habitat by using ramps 144, 146, 148 and 150. The animal may obtain a drink of water from bottle 260 by using ramps 144 and 142.

The animal may also leave housing 12 through opening 48 and enter exercise wheel 50. The animal may then run on exercise wheel 50 in "treadmill fashion" causeing it to rotate. This, in turn, will reciprocate piston rod 86 causing slider 98 to reciprocate much to the amusement of a child-user of habitat 10. Additionally, rotation of wheel 50 will cause protuberances 76 to cyclically engage end 112 of trip wire 110 rocking it on spindle 104 so that bell wire 118 will be reciprocated causing bell 274 to ring.

Rotation of wheel 50 in the direction of arrow 308 (FIG. 7) will rotate disc 60 in the direction of arrow 310. Disc 60 will then rotate running wheel 62 in the direction of arrow 312 which, in turn, causes running wheel 64 to rotate in the direction of arrow 314. The animation provided by running wheel 62, 64 may be enhanced by decorating them with a suitable decals (not shown).

The animal may be prevented from rotating wheel 50 by taking pin 304 from its storage positon on base 186 and placing it in aperature 300 in front of thee front edge 302 of slider box 38. Bell 274 may be kept from ringing even though wheel 58 is actuated by removing bell 274 from hook 286 and by engaging wire 118 in slot 288 on bell tower 276.

An additional habitat (not shown) may be connected to habitat 10 by removing cap 46 from coupling 44 and connecting the additional habitat to habitat 10 with a suitable tube (not shown).

Habitat 10 may be readily disassembled for cleaning by removing pin 88 to free piston rod 86 which, in turn, may be removed by rotating it 90° so that tabs 92, 94 will pass through slots 100 and 96. Pins 66 may then be removed so that wheels 50, 62 and 64 and disc 60 may be removed. Housing 12 may then be readily removed from base 186 and the housing halves may be separated by releasing tabs 178, 180, 182 and 184.

It will be apparent skilled in the art that habitat 10 may be either supported on a suitable surface by base 186 or hung on a wall by engaging aperatures 166, 68 on suitable hangers.

Although the invention has been herein shown and described in what is conceived to be the most practical and preferred embodiment, it is recognized that departures may be made therefrom within the scope of the invention, which is not to be limited to the illustrative details disclosed.

What is claimed is:
1. In an animal habitat of the type which includes an exercise wheel simulating the drive wheel on a steam-powered locomotive, the improvement wherein said habitat includes,
   a tray simulating a railway bed,
   a housing forming an enclosure for housing a pet above said tray, including a pair of cylindrical locking tabs extending across the full width of the bottom of said housing, said tray including a pair of slotted cylindrical channels each engageable by an associated one of said cylindrical locking tabs for maintaining said housing in an upright position on said tray, said housing including a front housing half being molded in bas-relief to simulate said locomotive, said rear housing half being a substantially planar member having a peripheral channel engageable by the peripheral edge of said front housing for forming a channel for urine discharged by an animal in said housing,
   an exercise wheel movably mounted on said habitat and in communication with said housing,
   animating means movably mounted on said habitat,
   and means connecting said animating means to said exercise wheel, whereby movement of said exercise wheel actuates said animating means.

* * * * *